United States Patent [19]

Fischer et al.

[11] 4,406,948
[45] Sep. 27, 1983

[54] DEVICE FOR MEASURING THIN FILMS BY MEANS OF BETA RADIATION

[76] Inventors: Helmut Fischer, Bergwaldstr. 38, 7261 Gechingen; Willi Steegmuller, Tulpenstr. 19, 7407 Rottenburg/Neckar 15; Werner Volz, Buckenhaldenweg 7, Sindelfingen-6, all of Fed. Rep. of Germany

[21] Appl. No.: 196,541

[22] Filed: Oct. 14, 1980

[30] Foreign Application Priority Data

Aug. 9, 1980 [DE] Fed. Rep. of Germany ....... 3030227

[51] Int. Cl.³ .......................................... G01N 23/00
[52] U.S. Cl. .................................. 250/308; 250/358.1
[58] Field of Search ................... 250/308, 358 R, 496, 250/521, 522

[56] References Cited

U.S. PATENT DOCUMENTS

| 3,012,143 | 12/1961 | Cheek et al. | 250/308 |
| 3,319,067 | 5/1967 | Joffe et al. | 250/308 |
| 3,714,436 | 1/1973 | Fischer | 250/308 |

*Primary Examiner*—Alfred E. Smith
*Assistant Examiner*—Janice A. Howell

[57] ABSTRACT

A tube arrangement has a first partial tube and a second partial tube, and one fine adjustment arrangement for coaxially displacing the partial tubes with respect to one another. The partial tubes, an aperture ring with a small aperture opening, a beta radiator point source and a GM-counter are coaxially arranged. The partial tubes are connected each with one or two of the following: an aperture ring, the beta radiator point source, and the GM-counter. A blocking means blocks the fine adjustment arrangement. One of the partial tubes is connected galvanically conducting with the GM-counter anode and the other partial tubes are connected galvanically conducting with the GM-counter cathode.

16 Claims, 15 Drawing Figures

DEVICE FOR MEASURING THIN FILMS BY MEANS OF BETA RADIATION

The invention concerns a device for measuring thin films with the beta ray technique, having an aperture ring which has a small aperture opening, a beta radiator point source which is coaxial with the aperture opening and is located at a distance behind the aperture opening, a support arrangement for the point source, a Geiger-Müller (GM) counter, having an anode and a cathode, arranged coaxially behind the support arrangement, a holder arrangement for the GM-counter, a contact arrangement for the GM-counter cathode.

BACKGROUND OF THE INVENTION

These devices allow optimal measurements when the distance between the point source and the aperture is also optimal. The order of magnitude of the distances is in the range from 0.1 to 1 mm, so that variations in the distance considerably impair the pre-established optimization. Such variations in distance may occur intentionally or accidentally by the user.

Another disadvantage of the prior devices is that after application of the direct current voltage to the Geiger-Müller-counter, the properties of the device continue to vary for a certain period of time. A "built-up" state is obtained only after a longer period of time. In the prevailing technology this is disadvantageous because the beta rays yield only statistically detectable measuring results, so that the statistics are superposed by another time dependent process.

In addition, the disadvantage of the prior devices is that their changing out is very time-consuming. There are various measuring problems (different materials on different films, different thicknesses, different apertures for differently curved measuring objects, and so on). Sometimes promethium is better suited as radiator, sometimes tallium, sometimes strontium.

Finally, the prior art devices do not take into account that every radiator represents an individual with respect to the radiating isotope and that every device must be tuned to this individual.

OBJECT AND STATEMENT OF THE INVENTION

It is the object of the invention to obtain a device which avoids all of the above disadvantages in an economical manner.

According to the invention, this object is achieved by a tube arrangement having at least a first partial tube and a second partial tube, and at least one fine adjustment arrangement for coaxially displacing the partial tubes with respect to one another. The partial tubes, the beta radiator point source and the GM-counter are coaxially arranged. The partial tubes are connected each with one or two of the following: the aperture ring, the beta radiator point source, and the GM-counter, at least one blocking means for blocking the fine adjustment arrangement, one of the partial tubes being connected galvanically conducting with the GM-counter anode and the other of the partial tubes being connected galvanically conducting with the GM-counter cathode.

Consequently, at least the following advantages are achieved:

(a) A compact measuring device is created, which is readily replaced like a safety fuse or a microscope viewer or a light bulb.

(b) The device can be set in a simple manner to the smallest measurements.

(c) Since the construction is optimized, it is possible to work with smaller apertures without losing accuracy. As a result, in practical applications, the larger number of apertures now in use can be reduced to two measuring elements, which, on the basis of past experience, cover 95% of all applications.

(d) In the case or repairs, fasteners can be loosened at the manufacturer's plant where any required work can be carried out. The customer receives the complete, installed device.

(e) Since one unit has been created, it can be kept in a waiting position in a stand similar to a battery charging stand or a test tube stand, under voltage, the measuring element preserves its properties and the constants stored in the computer portion of the measuring system invariably preserve their validity.

One partial tube supports the aperture ring and the point source of the GM-counter and the point source, connected to one another in rigid geometry and the other partial tube supports the GM-counter or the aperture ring, respectively. These characteristic features allow the device to be adjusted through a single setting, since only the two partial tubes need be displaced with respect to one another.

One partial tube is in front of the other, and the front partial tube supports the aperture ring and the rear partial tube supports the point source GM-counter. A particularly advantageous layout of the structural units is achieved through these characteristic features although another layout is also possible.

The fine adjustment arrangement comprises a fine thread with a pitch of 0.5 mm to 1 mm per rotation. A particularly simple fine adjustment device is achieved through these characteristic features which always preserves the coaxiality and which readily realizes a 3°-rotation and allows appropriately fine distance variations.

The front partial tube comprises a sleeve unit with an inner thread, the rear partial tube has a screw arrangement for securing the GM-counter therein, and has on its front area an outer thread fitting into the inner thread of the front partial tube, and the blocking means comprises a counter-thread ring inserted on the outer thread of the rear partial tube. These characteristic features, on the one hand, allow the GM-counter to be positioned in the correct position in the rear partial tube in a simple manner and on the other hand, allow the structural unit allocated to the front partial tube to be positioned in a simple manner and adjusted to the correct position.

The front partial tube consists of metal and has a circular spring for galvanically connecting with the GM-counter, the GM-counter has a screw base, and the rear partial tube comprises an insulator having a coaxial metal inner ring into which the screw base of the GM-counter is screwed, and a metal plate located coaxially in the bottom of the rear partial tube which is connected galvanically conducting with the metal inner ring. These characteristic features yield simple contacting. The front partial tube can be used as a holding means in a measuring table. The scattering capacity is low and, accordingly the counting rates are high. The contacting options are thus simple, as e.g., in the case of a battery.

The rear partial tube has an opening and an operating resistance of the GM-counter located in the opening, one wire of the operating resistance is galvanically connected to the GM-counter anode and the other wire of the operating resistance is galvanically connected to a shunt conductor. These characteristic features make it possible for the device to have a very low capacitance operating resistance.

A jacket ring having spokes which support the point source and a rear end fact, and the GM-counter has a jacket having a front end face which is rigidly fastened to the rear end face of the jacket ring. These characteristic features make it possible for to simply insert the carrier arrangement on the GM-counter and simply connect it with the same, without entailing any noticeable shading caused by back-scattered beta rays.

The GM-counter has a circular cylindrical jacket ring on the front which is followed by a ceramic center part, which is followed by screw base, and pump-off nozzle which passes through the screw base. These characteristic features give a cartridge-like, very low capacitance unit.

The GM-counter has a diameter of 0.5-1.3 cm, and is sealed with a mica window weighing from 1.5 to 0.7 mg/cm$^2$. A GM-counter according to these features has proved itself with respect to optimal detection of low-energy back-scattered radiation, magnitude of radiation capturing area, and the requirement for creating a partial vacuum in the interior of a GM-counter.

The aperture ring is a separate structural unit and is mounted coaxially positioned to the appropriate partial tube. These characteristic features allow the aperture ring to be replaced and the same device to be used with different aperture rings in a very diversified manner, if optimization (minimalization of statistical errors) can be neglected.

Between the point source and aperture ring, under the aperture ring, a point source cover is provided which has a coaxial hole for the unimpeded passage of the beta rays of the point source. Through these characteristic features the point source is not damaged when the aperture rings are replaced.

The following items had to be taken into account for the device:

1. GM-counter can be manufactured with a partial vacuum or they can be filled with gas which has a partial vacuum. In the present case gas-filled GM-counters are used, since they yield a larger output pulse.

2. For appropriate output side connected amplifiers, proportional counter tubes can be used as GM-counter tubes in the sense of this invention.

3. Ionization chambers as nuclear radiation detectors are available. Their degree of efficiency increases with the chamber volume, whereas the particular sense of the invention is to create relatively small devices.

4. Prior art semiconductor detectors are not suitable, since, so far, their properties are not equivalent to the GM-counters, they require very low cooling, and the cooling equipment makes the interchangeability of the devices almost impossible.

5. Scintillation tubes are also unsuited. These require a photomultiplier, which would render the device costly, bulky, complex, and large.

DESCRIPTION OF THE DRAWINGS

The invention is now described on the basis of preferred exemplified embodiments. The drawing shows the following.

Unless otherwise specified, the Figures are three times enlarged representations of the original. In reality the device is not even as large as a thumb.

DETAILED DESCRIPTION

The invention incorporates a partial tube 21, a second partial tube 22, a GM-counter 23 as well as an aperture ring 24, and a carrier arrangement 26 for a point source 27.

The invention will now be described in detail.

According to German Pat. No. 20 13 270 (U.S. Pat. No. 3,714,436, British Pat. No. 1, 323,906) a bearing jewel 28 is arranged coaxially to a geometrical longitudinal axis 29. The bearing jewel has an aperture opening 30 going through it, which is coaxial in at least partial regions and in the present case has a form of a radial slit. Bearing jewel 28 is mounted in aperture ring 24 which encompasses a truncated cone sheath 31, which is coaxially arranged. It goes over into a ring adapter 32, which is followed by a grooved annular tee-slot 33. From there the aperture ring 24, to which the above specified parts belong, goes over into the partial tube 21, which is coaxially arranged and has the form of an extensively circular cylindrical nut. In order to catch hold in a measuring arrangement, not shown, a transverse groove 34 is cut as a secant into the sheath of partial tube 21. In addition, an axially parallel longitudinal groove 36 is cut into the sheath of partial tube 21, which is accessible on the front in axially parallel fashion, so that an assembling tool can be inserted there. In the rear, partial tube 21 has a radial end face 37, which forms a ring. In the interior of partial tube 21 there is a coaxial circular cylindrical cavity 38, which goes over into the corresponding interior cavity of aperture ring 24. The interior wall of partial tube 21 is equipped with a fine thread 39, which starts at end face 37 and extends over almost the complete length of partial tube 21. With the exception of bearing jewel 28, the parts described so far are metallic.

Partial tube 22 consists of RESITEX as insulating material and is dielectric. It is arranged coaxially to longitudinal axis 29. With its external fine thread 41 it can be screwed into the inner fine thread 39. This metal/plastic pair has a low friction resistance so that partial tubes 21, 22 can be precision rotated with respect to one another.

Fine thread 41 in the rear goes over into a circular ring-shaped radial attachment 42 so that a cylindrical body 43 of a slightly larger diameter follows. The circular ring-shaped stage 44 is followed by base 46 which is considerably smaller in diameter. A depression 48 is provided in its bottom 47, which, like base 46, is coaxial. Partial tube 22 has in its interior a coaxial circular cylindrical blind-end bore 49. From it a through hole 51 leads into depression 48.

Figure 2:
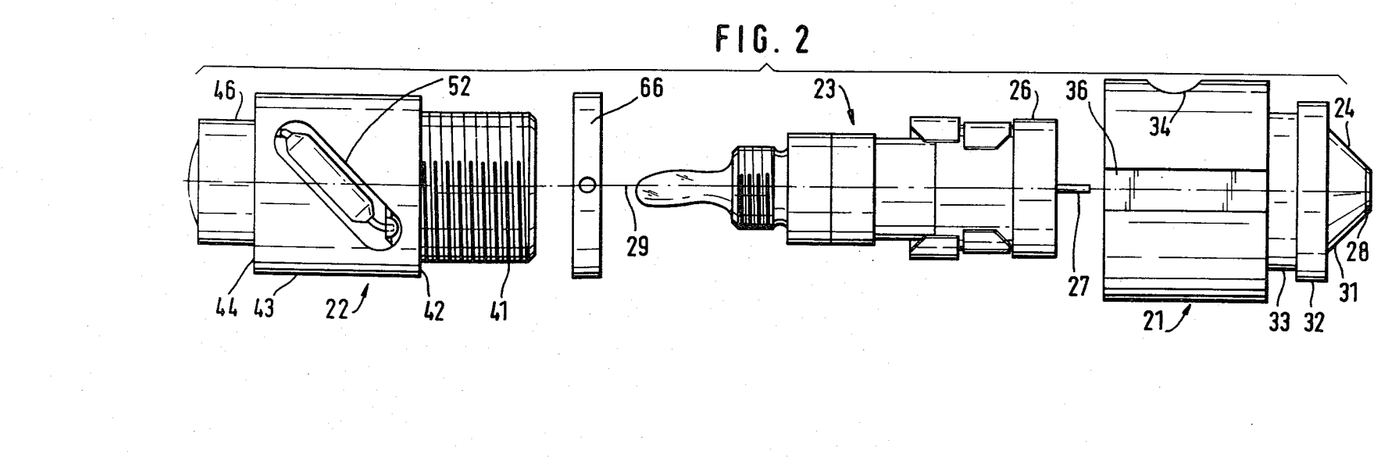
FIG. 2 an exploded view of the device according to FIG. 1, where the contact spring is located on the cathode, FIG. 3 a view according to arrow A in FIG. 1, FIG. 4 a view antiparallel to arrow A into the front partial tube, FIG. 5 front view of support arrangement, inserted on the GM-counter, FIG. 6 a section along line 6—6 of FIG. 5 in a more enlarged scale, FIG. 7 a side view of the contact spring, FIG. 8 axial view of the contact spring, FIG. 9 axial view of counter-ring, FIG. 10 a more enlarged sectional view through the GM-counter, FIG. 11 an axial view into the rear partial tube, FIG. 12 a view according to arrow B in FIG. 1, FIG. 13 the arrangement of the screw ring in the rear partial tube, the spatial layout of the operating resistance, and contact plate with the shaded area being the rear part of the GM-counter.
Figure 3:
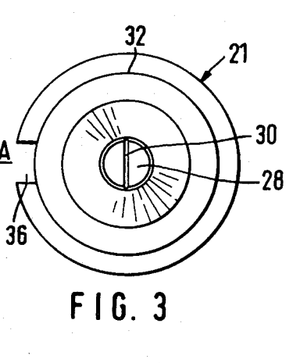
Figure 4:
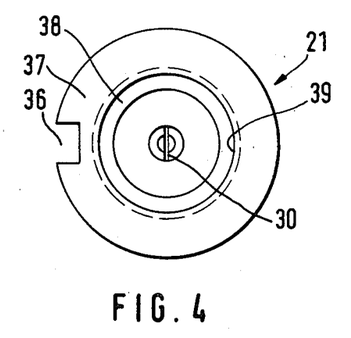
Figure 5:
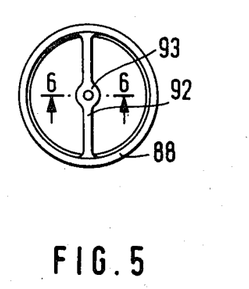
Figure 13:
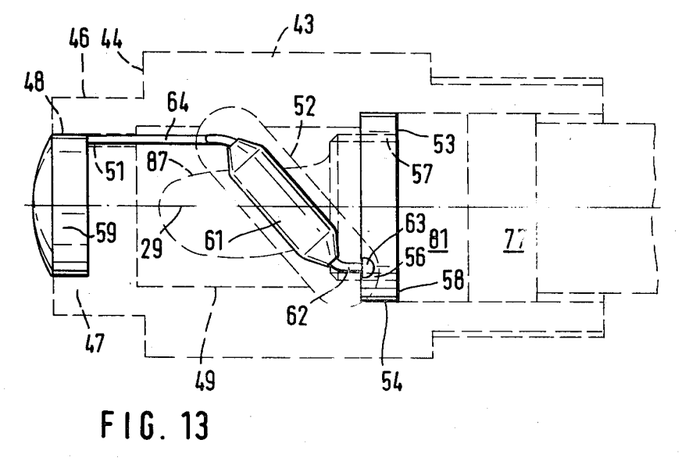

According to FIG. 2 and indirectly also FIG. 13, cylindrical body 43 is equipped with a slotted hole 52, which passes completely through the wall of cylindrical body 43, is approximately of the length of a 1/10 watt resistance and is at an angle of about 45° in FIG. 2.

A brass ring 53 is arranged coaxially. With its circular cylindrical exterior peripheral area 54 it is glued to the wall of blind-end bore 49 in such an axial position that the exterior peripheral area 54 appears, with a corresponding partial region 52, according to FIG. 2, in the end region of slotted hole 52. Brass ring 53 has an interior thread 57 and, according to FIG. 13, on the right a radial end face 58. Brass ring 53 is only several millimeters long, thin, and lightweight and, therefore, represents only a slight capacitance with respect to ground.

A metal contact chip 59 is glued in depression 46, which is protected there, but slightly extends over base 46 in the rear.

Slotted hole 52 incorporates a 1/10 watt resistance 61 as the operating resistance of GM-counter 23. Since cylinder body 43 is thicker than the diameter of resistance 61, resistance 61 is protected in slotted hole 52 and, if necessary, can be cast therein. Its right leg 62 is soldered with a solder point 63 on partial range 56. This can be carried out with the aid of contemporary precision solder irons through the slotted hole 52 which is smaller per se. The left leg 64 is bent twice at right angles, partially runs through the exterior region of blind-end hole 49, passes through the through boring 51, and is soldered to contact chip 59.

A narrow counter ring 66 with corresponding interior fine thread sits on fine thread 41, the outer diameter of which is slightly larger than the outer diameter of cylinder body 43. If for the rotationally fastened partial tubes 21, 22, counter ring 66 is tightly turned against end face 37 and secured, in addition, with lacquer or a setscrew, then partial tubes 21, 22 remain in an axially invariable position with respect to one another.

GM-counter tube 23 incorporates a metallic circular cylinder-shaped cathode 67, which represents a circular ring sheath, the outer diameter of which is smaller than the inner diameter of fine thread 39. At a distance from the front circular ring shaped end face 68 a circular mica window 69 is fused in. Cathode 67 is coaxially arranged. A coaxially arranged anode 72 is provided in ionization space 71, consisting of a wire 73, on the free end of which, directly behind mica window 69, there is located an axially symmetrical thickening 74 with an approximately elliptical cross-section. A ceramic body 76 is glued airtight from the rear into ionization space 71. It is circular cylindrical and has a small flange 77 in its back end region. Further, it has a coaxial through boring 78 through which wire 73 extends.

A screw base 79 is glued airtight from the rear on flange 77, which consists of metal, exhibits a connecting flange 81 fitting flange 77, which, like flange 77, has an outer diameter which is smaller than the diameter of blind-end bore 49.

The connecting flange 81 goes, after a radial circular end face 82 extending inward, into an external thread. Screw base 79 has a coaxial through boring 84 into which wire 73 extends and is connected, galvanically conducting, to screw base 79. A pump-off nozzle 87 consisting of glass is fused on the rear radial face 86, through which an adequate underpressure can be created in ionization space 71 via the through borings 78, 84. GM-counter 23 is tightly screwed in brass ring 53 with its screw base 79 so that end faces 58 and 82 tightly adjoin and subsequent twisting is not allowed. In the mounted state, pump-off nozzle 87 protrudes in a protected manner into the rear area of blind-end bore 49 without touching bottom 47. Pump-off nozzle does not touch resistance 61 or leg 64 since they are arranged radially further outward.

When GM-counter is screwed into partial tube 22, only about a half of ceramic body 76 protrudes toward the front over partial tube 22.

Carrier arrangement 26 incorporates a circular cylindrical coaxial ring 88 of metal, which has a slightly larger outer diameter than cathode 67. Ring 88 fits with only a slight clearance into the inner diameter of fine thread 39, so that an auxiliary mounting procedure is required. Ring 88 is glued with its rear end face 89 on the also radial end face 68. The outer wall of ring 88 protrudes radially slightly above the anode. The inner wall 91 or ring 88 is slightly displaced outwardly with respect to the inner wall of cathode 67 and, therefore, does not shade ionization space 71. Inner wall 91, at two points displaced by 180° with respect to one another, goes into a radial spoke 92, which is thin in the shading direction and exhibits in the center coaxially a ring-shaped thickening 93. Thickening 93 has a coaxial through-hole 94 into which point source 27 is glued flush from the back. Point source 27 consists of a small tube 96 of an outer diameter of 2 mm, which consists of a beta ray absorbing material. Although the scale of the drawings is specified above, this tube dimension is given once more for the sake of a size comparison, since a possible enlargement could falsify the evaluation of the invention.

Tube 96 incorporates coaxially a wire 97 which terminates it towards the rear on its largest part of the length and which on its front end face 98 carries a radiator sphere 99. The front end of tube 96 is closed with a 10 Mü thick titanium foil 101. The separation of radiator sphere 99 from titanium foil 101 is from 0.1 to 0.2 mm, if the radiator sphere 99 consists of promethium, thallium, strontium.

The separation for a cadmium radiator is slightly larger. Although, as a result, the radiator sphere 99 is located far to the front, the whole can be considered as a point source.

In the completely mounted state titanium foil 101 is at a distance of about 0.1 to 0.8 mm from the front side of the bearing jewel 28. The first dimension is valid only if bearing jewel 28 on the rear has a coaxial opening dimensioned in such a way that the front end of tube 96 at least partially extends into bearing jewel 28.

Figure 1:
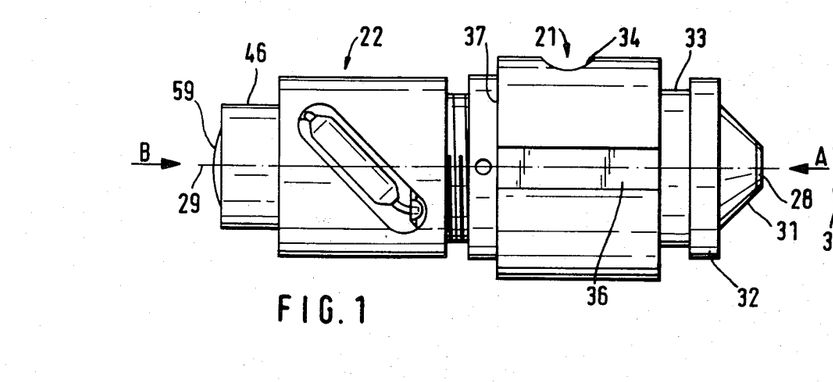
FIG. 1 a side view of the device.
Figures 6, 7, 8:
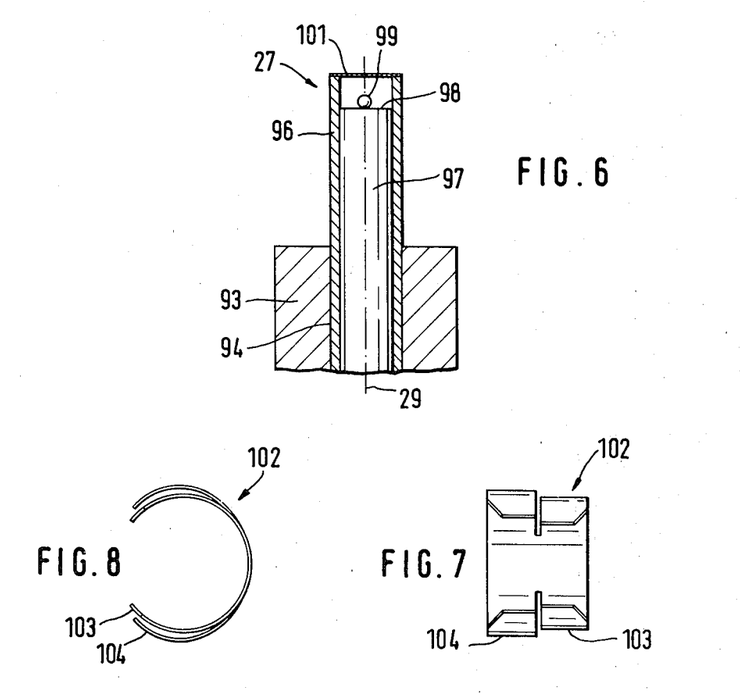
Figure 9:
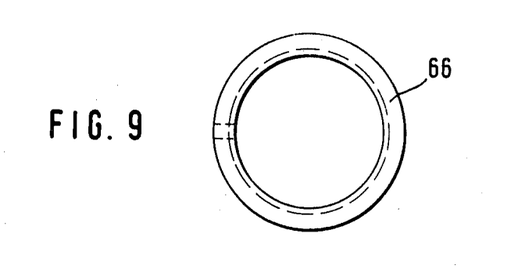
Figure 10:
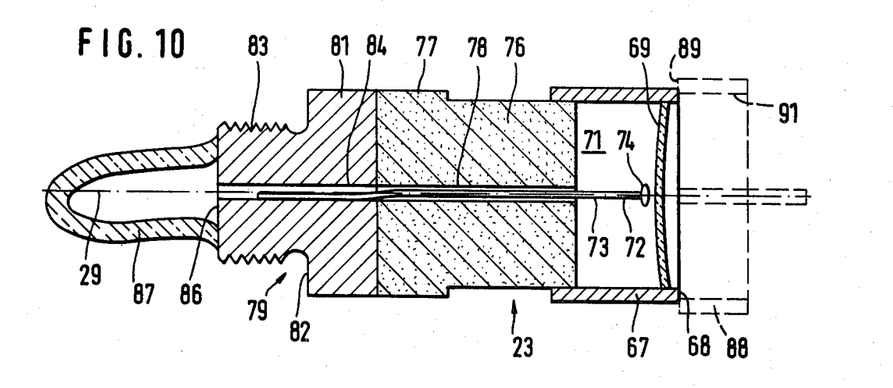
Figure 11:
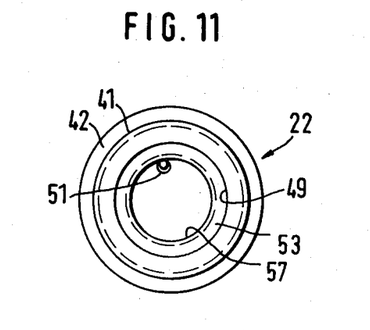
Figure 12:
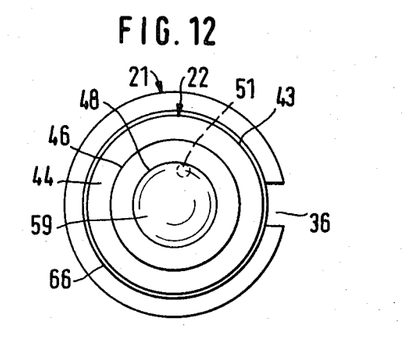

A contact spring 102 shown in detail in FIGS. 7 and 8 consists of fin pairs 103 and 104 joined along the ridge. In the relaxed state, according to FIG. 1, fin pair 103 has a slightly smaller diameter than fin pair 104. Fin pair 103 serves for mechanically clamping and electrically conducting the contact spring 102 on cathode 67, whereas the fin pair 103 can be pushed forward to such an extent that it joins the end face 89. Outwardly it does not extend above ring 88, so that the unit can still be inserted in fine thread 39.

Fin pair 104 is connected over the ridge galvanically conducting with fin pair 103 and projects away, at least with partial regions, to such an extent from the geometrical axis 29, that when screwed into partial tube 21 it makes contact with fine thread 39 which forms numerous point contacts. Fin pair 104 is also partially inserted on cathode 67 and cannot be pushed too far on the periphery of ceramic body 76. Consequently, contact spring 102 represents a galvanically conducting contact between cathode 67 and partial tube 21.

Figure 14:
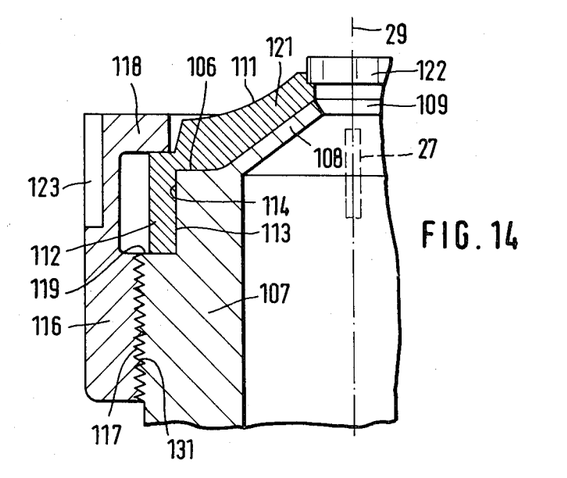
FIG. 14 a radial section through a second exemplified embodiment in the aperture ring area, FIG. 15 a radial view of a tool for the device together with the device, both inserted together in the readiness stand.

FIG. 14 shows a second exemplified embodiment which, on the one hand, supports the filigree point source 27 and, on the other hand, allows to replace aperture ring 24, so that is is possible to adapt to different measuring problems. For this purpose a protective wall 108 runs coaxially from an end face 106 of partial tube 107, which extends in a cone base manner and has an inner opening 109, which does not impede the beta rays for certain, into which titanium foil 101 may in fact penetrate, but in any case definitely prevents the point source 27 from being bent when the inner opening 109 is touched with the finger so that the already established setting is no longer correct.

An aperture ring 111, as a separate structural component inserted from the front on partial tube 107, has a coaxial outer flange 122, which, with its inner surface 113, lies on a short face-end-side coaxial outer ring surface 114 in a positioning manner. Towards the back, aperture ring 111 is tightened through a screw cap 116, which has an internal thread 117 and is screwed on a corresponding outer thread on partial tube 107. With outer flange 118 screw cap 116 tightens outer flange 112 against a circular shoulder 119 so that axial movements are impossible. In analogy to protective wall 108, aperture 111 has a cone base 121 which runs approximately parallel to it and supports bearing jewel 122.

Two depressions 123, displaced by 180° are provided in the screw cap 116, which are accessible from the end face and from the outside.

Figure 15:
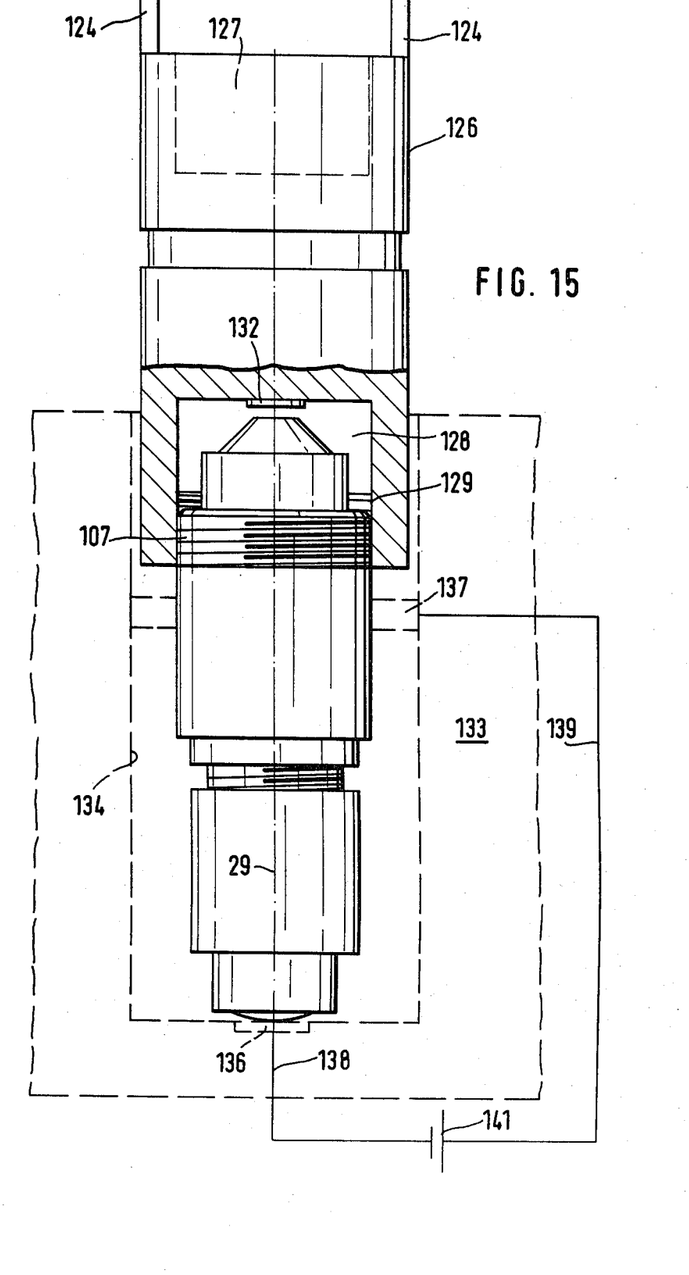

The lugs 124 of a multiple tool 126 can be inserted in these. This multiple tool 126 has a depression 127 on its end face, into which the cone base 121 and bearing jewel 122 can be inserted when screwing off the screw cap 116.

When the screw cap 116 has been screwed off, then the damping ring 111 can also be removed and replaced with another and the same screw cap 116 can be screwed on with the aid of multiple tool 126.

If the unit is not to be used because a different radiator is to be used, then multiple tool 126 is also employed. For this purpose it is equipped with another coaxial blind end hole 128 from the side of the other end face, which exhibits an inner thread and which fits on the outer thread 131 of partial tube 107. Multiple tool 126 consists of beta ray absorbing material and of infinite thickness for beta rays (e.g., aluminum). A layer 132 is applied to the bottom of blind end hole 128, which has already known back scatter data. The multiple tool 126 together with the unit according to the invention can be inserted in a stand 133, which has an appropriately sized clearance 134 and is open toward the top. A contact plate 136 is located on its bottom and at a certain height there is a flexible ring contact 137 not shown in detail. The latter establishes contact with partial tube 21 and cathode 67. Contact plate 136 contacts contact disk 59 as well as anode 72. So that the unit is constantly under operating voltage, leads 138 and 139 to a high voltage source are provided. A counter, not shown, is also interconnected to this link so that the back-scattered beta particles can always be counted.

We claim:

1. In a device for measuring thin films with the beta backscatter radiation technique, having an aperture ring which has a small aperture opening, a beta radiation point source which is coaxial with the aperture opening and is located at a distance behind the aperture opening, a support arrangement for the point source, a Geiger-Müller (GM) counter, having an anode and a cathode, arranged coaxially behind the support arrangement, a holder arrangement for the GM-counter, a contact arrangement for the GM-counter anode, and a contact arrangement for the GM-counter cathode;

the improvement comprising:
an outer tube arrangement, having at least a first partial tube and a second partial tube,
at least one fine adjustment arrangement for coaxially displacing the partial tubes with respect to one another, and
at least one blocking means for blocking the fine adjustment arrangment,
the partial tubes, the beta radiation point source and the GM-counter being coaxially arranged,
one of the partial tubes being connected with one of the following: the aperture ring, the beta radiation point source, and the GM-counter, the other partial tube being connected with the other two,
one of the partial tubes being connected galvanically conducting with the GM-counter anode and the other of the partial tubes being connected galvanically conducting with the GM-counter cathode.

2. Device according to claim 1, in which one partial tube supports the aperture ring and the point source connected to one another in rigid geometry and the other partial tube supports the GM-counter.

3. Device according to claim 1, in which one partial tube supports the GM-counter and the point source connected to one another in rigid geometry and the other partial tube supports the aperture ring.

4. Device according to claim 3, in which one partial tube is in front of the other, and the front partial tube supports the aperture ring and the rear partial tube supports the point source and the GM-counter.

5. Device according to claim 4, in which the front partial tube comprises a sleeve unit with an inner thread, the rear partial tube has a screw arrangement for securing the GM-counter therein, and has on its front area an outer thread fitting into the inner thread on the front partial tube, and the blocking means comprises a counter-thread ring inserted on the outer thread of the rear partial tube.

6. Device according to claim 4, in which the front partial tube consists of metal and has a circular spring for galvanically connecting with the GM-counter, the GM-counter has a screw base, and the rear partial tube comprises an insulator having a coaxial metal inner ring into which the screw base of the GM-counter is screwed, and a metal plate located coaxially in the bottom of the rear partial tube which is connected galvanically conducting with the metal inner ring.

7. Device according to claim 1, in which one partial tube supports the GM-counter and the aperture ring connected to one another in rigid geometry and the other partial tube supports the point source.

8. Device according to any one of claims 2, 3, or 7 in which the rear partial tube has an opening and an operating resistance of the GM-counter located in the opening, one wire of the operating resistance is galvanically connected to the GM-counter anode and the other wire of the operating resistance is galvanically connected to a shunt conductor.

9. Device according to any one of claims 2, 3 or 7, comprising a jacket ring having spokes which support the point source and a rear end face, and the GM-counter has a jacket having a front end face which is rigidly fastened to the rear end face of the jacket ring.

10. Device according to claim 1, in which the aperture ring is a separate structural unit and is mounted coaxially positioned to the appropriate partial tube.

11. Device according to claim 1 or 10, in which between the point source and aperture ring, under the aperture ring, a point source cover is provided which has a coaxial hole for the unimpeded passage of the beta radiation from the point source.

12. Device according to claim 1, in which the GM-counter has a circular cylindrical jacket ring on the front which is followed by a ceramic center part, which is followed by screw base, and pump-off nozzle which passes through the screw base.

13. Device according to claim 12, in which the GM-counter has a diameter of 0.5–1.3 cm, and is sealed with a mica window weighing from 1.5 to 0.7 mg/cm$^2$.

14. Device according to claim 12, in which the GM-counter has a diameter of 0.8 cm, and is sealed with a mica window weighing approximately 1 mg./cm$^2$.

15. Device according to claim 1, in which the fine adjustment arrangement comprises a fine thread with a pitch of 0.5 mm to 1 mm per rotation.

16. Device according to claim 1, in which the fine adjustment arrangement comprises a fine thread with a pitch of 0.75 mm.

* * * * *